United States Patent [19]

Mawhinney et al.

[11] Patent Number: 5,043,735

[45] Date of Patent: Aug. 27, 1991

[54] DEVICE FOR DETERMINING THE TOPOGRAPHIC MAP OF THE LOADING SURFACE OF A SHAFT FURNACE

[75] Inventors: Daniel D. Mawhinney, Livingston, N.J.; Emile Lonardi, Bascharage, Luxembourg; Emile Breden, Godbrange, Luxembourg; Jeannot Loutsch, Howald, Luxembourg

[73] Assignees: Paul Wurth S. A., Luxembourg; MMTC Inc., Princeton, N.J.

[21] Appl. No.: 579,833

[22] Filed: Sep. 6, 1990

[30] Foreign Application Priority Data

Sep. 7, 1989 [LU] Luxembourg ............................ 87578

[51] Int. Cl.⁵ .......................... G01S 13/08; C21B 7/24
[52] U.S. Cl. ................................. 342/124; 73/290 R; 266/92

[58] Field of Search .................... 342/124; 266/94, 92, 266/99, 100; 343/777, 778; 73/290 R; 367/908

[56] References Cited

U.S. PATENT DOCUMENTS

| 4,110,617 | 8/1978 | Legille | 250/342 |
| 4,290,067 | 9/1981 | Legille et al. | 342/124 |

FOREIGN PATENT DOCUMENTS 0291757  11/1988  European Pat. Off. .............. 266/99

Primary Examiner—Gilberto Barrón, Jr.
Attorney, Agent, or Firm—Fishman, Dionne & Cantor

[57] ABSTRACT

A radar probe including several individual scanning antennas is mounted in the wall of the furnace above the loading surface and performs a two-dimensional scanning of the entire loading surface.

10 Claims, 1 Drawing Sheet

U.S. Patent
Aug. 27, 1991
5,043,735
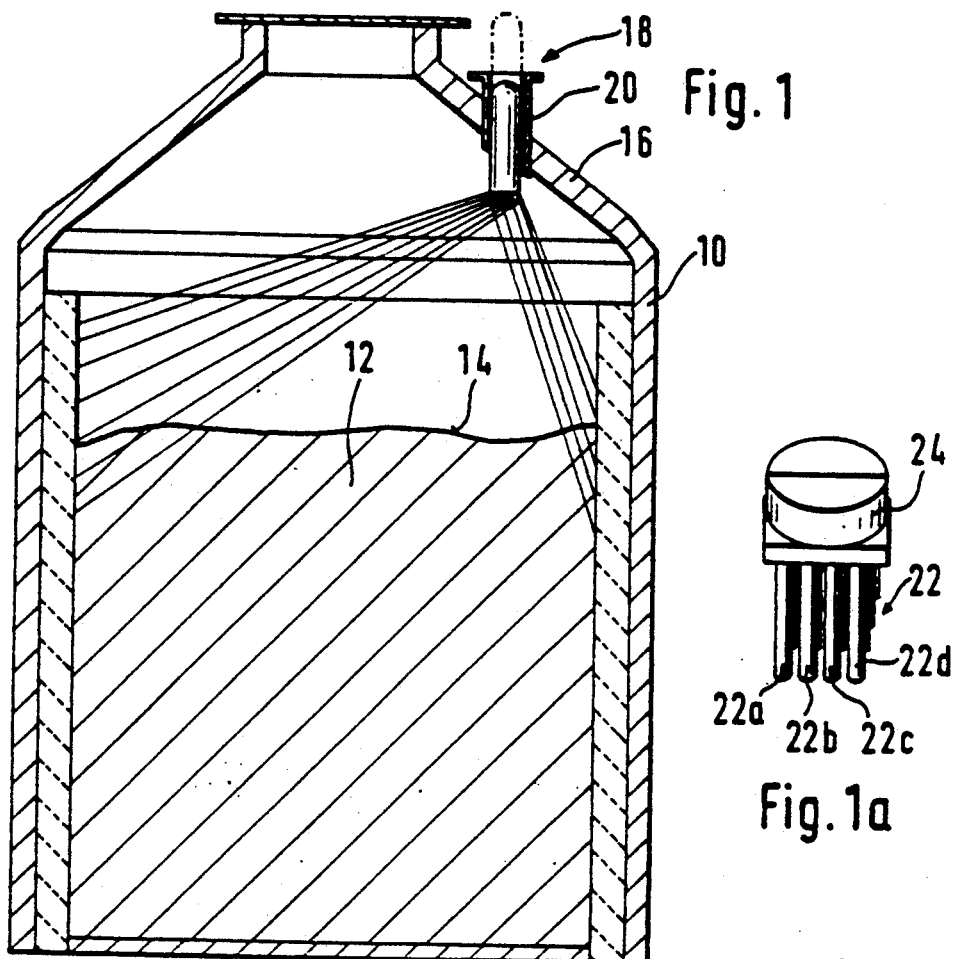
Fig. 1
Fig. 1a
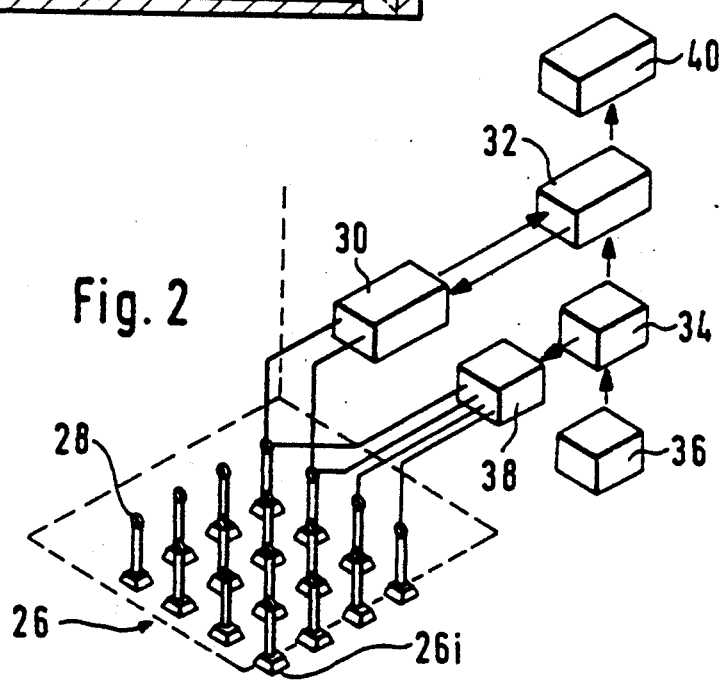
Fig. 2

DEVICE FOR DETERMINING THE TOPOGRAPHIC MAP OF THE LOADING SURFACE OF A SHAFT FURNACE

TECHNICAL FIELD

The present invention relates to shaft furnaces and more particularly to a device for determining a topographic map of the loading surface of a shaft furnace.

BACKGROUND OF THE INVENTION

It is known to use radar probes for determining the profile of the loading surface of a shaft furnace in order to better control the running of the furnace and to optimize the loading configuration. In order to be advantageous, these probes must allow a measurement which is as accurate as possible in a minimum of time.

The document EP-A1-0,291,757 describes a radar probe which is mounted at the end of an arm inserted horizontally in the furnace above the loading surface. This probe has the advantage of being able to scan in the two opposite directions and to provide, depending on the density of the measurement positions, an image which is sufficiently representative of the entire loading surface. The disadvantage of this probe is that the loading must be interrupted, not only during the period of the measurement, but also during the insertion and withdrawal of the probe arm. This arm also requires a relatively large mechanical structure. Another disadvantage of this probe is that it is relatively close to the loading surface and that the radar beams, particularly those directed towards the periphery, meet the surface at a very acute angle which makes the processing of the measurement results difficult.

Another known radar probe is that described in U.S. Pat. No. 4,332,374, the disclosure of which is incorporated herein by reference. The antenna of this radar probe is mounted in a window in the oblique wall of the furnace above the loading surface, on a support which can be moved vertically. The advantage of this probe is that it is a little more distant from the loading surface than the previous probe and that the radar beams are less oblique in comparison with the previously mentioned probe. Although the antenna can be driven in rotation about its vertical axis of suspension and can thus determine, by several successive measurements, the loading profile along a circular scanning line, it does not allow the probing of the entire loading surface. In order to be able to do this, it must be able to scan the surface in two perpendicular directions. However, the probe described in the '374 patent cannot provide a two dimensional mechanical scanning of the loading surface because this would require a large opening in the thick oblique wall of the furnace wall, associated with a window which is transparent to microwaves. In effect, such a window would reduce the mechanical strength of the wall too much and would be difficult to clean. On the other hand, the probe of the '374 patent has the advantage of requiring relatively simple mechanics.

SUMMARY OF THE INVENTION

The object of the present invention is to provide a new device for quickly determining the complete topographic map of the loading surface of the shaft furnace.

In order to achieve this objective, the present invention proposes a device for determining the topographic map of the loading surface of a shaft furnace using a radar probe mounted in the wall of the furnace above the loading surface, characterized in that the probe is designed to carry out a two dimensional scanning of the loading surface and in that it comprises several electronic scanning antennas.

According to a first embodiment, the antennas are disposed in line and are electronically scanned, while the support of the antennas can be pivoted perpendicular to the electronic scanning line. This antenna consequently allows a complete scanning of the loading surface by a mechanical scanning in one direction and an electronic scanning in the other direction. The mounting of this probe can be similar to that described in U.S. Pat. No. 4,332,374.

According to another embodiment, the antennas of the probe are arranged according to a fully electronic scanning grid of rows and columns. This embodiment has the advantage of a quasi-instantaneous probing of the entire loading surface. Another advantage is that of no longer requiring mechanical scanning components, even if the electronics necessary for the electronic scanning must be slightly more sophisticated.

The two embodiments of the device proposed by the invention have the advantage, with respect to existing probes, that they are much faster in obtaining measurements of the entire loading surface without having to interrupt the loading in order to carry out the probing.

Furthermore, both embodiments require only a relatively small window in the oblique wall of the furnace.

BRIEF DESCRIPTION OF THE DRAWING

Other features and characteristics will emerge from the detailed description of several advantageous embodiments given below by way of illustration and referring to the appended drawings in which:

FIG. 1 is a diagrammatic view of a cross-section through a shaft furnace with a first embodiment of a device according to the present invention;

FIG. 1a is diagram of the radar probe used in the first embodiment; and

FIG. 2 is a block diagram of a radar probe with fully electronic scanning.

DETAILED DESCRIPTION OF THE INVENTION

FIG. 1 is a diagram of a shaft furnace 10 with loading material 12 of which the topographic map of the surface 14 is to be determined. For this purpose, a radar probe is used which is mounted in the oblique section of the wall 16 of the furnace. The mounting of the probe 18 can be identical to that described in the U.S. Pat. No. 4,332,374, i.e., the probe can be moved vertically through a window 20 which is as narrow as possible and the probe can rotate about a vertical axis using appropriate means in order to carry out a one-dimensional mechanical scanning of the loading surface 14. Instead of being vertical, the window 20 through which the antenna 18 penetrates into the furnace could also be inclined. The depth of penetration of the antenna into the furnace must simply be sufficient to get past any obstacle and have a complete view of the loading surface.

Unlike the known radar probes which all comprise single antennas, the probe of the present invention comprises a composite antenna 22 constituted from an array, e.g. individual antennas 22a, 22b, 22c and 22d, associated with a phase shifting system 24. These individual antennas 22a–22d are aligned in a direction which is perpendicular to the direction of the mechanical scanning of the probe 18. For example, if the individual antennas 22a-22d are disposed in the cross-sectional plane of FIG. 1, the mechanical scanning of the probe 18 takes place perpendicular to the plane of FIG. 1.

By the control and command of the relative phase shift and of the amplitude of the microwave beam transmitted by each of the antennas 22a-22d, each of the beams can be directed precisely and in a controlled and programmed manner, i.e., the arrangement allows an electronic scanning in the vertical plane of the axes of the individual antennas 22a-22d.

The individual antennas 22a-22d can be constituted in the form of open waveguides or of small radiating horns mounted in a protective cover. The use of small individual antennas furthermore provides a certain flexibility in the disposition and geometric arrangement which makes the probe compatible with the available location and the extremely severe environmental conditions in this part of the shaft furnace.

FIG. 2 is a schematic diagram of a device for carrying entirely electronic scanning. It is not necessary to mount the probe including the antenna shown in FIG. 2 in such a way that a mechanical scanning can be carried out and it is sufficient to provide a support allowing the penetration of the antenna through a window like the window 20 in FIG. 1 in order for the antenna to be able to carry out the scanning of the loading surface and in order that it can be withdrawn from its scanning position in order not to be exposed to the conditions inside the furnace.

According to the embodiment in FIG. 2, the antenna 26 of the radar probe is constituted by a certain number of individual antennas 26i which are arranged in a matrix of m ×n, or a grid of m columns and n rows of individual antennas 26i. In the example shown, the antenna 26 is constituted from 16 individual antennas 26i arranged in 4 columns and 4 rows. Each of the individual antennas 26i radiates a small portion of the microwave energy available under the control of phase-shifter 28. The scanning is accomplished by a relative phase shifting of the beam transmitted by each antenna element 26i on the basis of a predetermined calibration in order to obtain a two dimensional control of the overall beam transmitted by the antenna 26.

As shown in FIG. 2, the individual antennas 26i are each connected through the phase-shifter 28 to a distribution system 30 which is supplied by a microwave circuit 32 comprising a high frequency oscillator. The frequency modulation of the signals transmitted by a circuit 32 is generated by a control unit 34 under the control of a programming unit 36. The control unit 34 also controls the phase shifting of each of the antennas 26i through a phase-shift control unit 38. Data processing unit 40 computes the distance of each of the individual antenna 26i from the point of reflection of the radar waves picked up after reflection on the loading surface. The signals picked up by each of the antennas 26i are returned through the microwave circuit 32 to the unit 40. After processing the measurement results and determining the heights for each of the antennas 26i, the result can be displayed in the form of a topographic map of the loading surface of the furnace.

The great advantage of the embodiment according to FIG. 2 is a quasi-instantaneous, two-dimensional viewing of the entire loading surface of the furnace without any moving and complex mechanical components.

It should be noted that the individual antennas of the embodiment in FIG. 2 and of the embodiment in FIG. 1 can be of the monostatic type, i.e. each of the individual antennas can serve as a transmitting antenna and as a receiving antenna, or can be of the bistatic type i.e., it is necessary to have one transmitting antenna and one receiving antenna which picks up the radar waves after reflection on the loading surface. In the case of bistatic antennas, it is obviously necessary to double the quantity of these antennas.

The choice between fully electronic two-dimensional scanning according to FIG. 2 or semi-electronic and semi-mechanical scanning according to FIG. 1 is a matter of compromise between the cost and complexity of the electronics with respect to those of the mechanics, knowing however that each of the two approaches allows a complete and rapid mapping of the entire loading surface of the shaft furnace.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A device for determining a topographic map of a loading surface of a shaft furnace, said shaft furnace including a wall, comprising:
   a radar probe mounted in the wall above the loading surface, said probe comprising a plurality of individual electronic scanning antennas, and said probe providing a two dimensional scan of the loading surface.

2. The device of claim 1, wherein the antennas are aligned in an array of rows and columns.

3. The device of claim 2, wherein the probe provides a substantially instantaneous electronic scan of the loading surface.

4. The device of claim 1, further comprising an antenna support member pivotably mounted in the wall and wherein the individual scanning antennas are disposed in a line on the support, said support member being pivotable in a direction perpendicular to said line.

5. The device of claim 4, wherein the probe provides the two dimensional scan by conducting a series of sequential linear electronic scans of the loading surface.

6. The device of claim 1, wherein the probe is received through a window in the upper wall of the furnace and is axially displaceable through the window.

7. The device of claim 1, wherein said antennas include a plurality of transmitting antennas for transmitting a radar beam, and further comprising:
   oscillator means for supplying a signal to the plurality of transmitting antennas;
   distribution means for distributing the signal to each of the transmitting antennas;
   phase shifting means for phase shifting the distributed signal, and;
   control means for controlling the phase shifting of the signal to control a beam of radar waves transmitted by the transmitting antennas.

8. The device of claim 7, wherein the beam is reflected by the loading surface, wherein the antennas include receiving antennas for receiving reflected radar waves, further comprising:
   signal processing means, responsive to received radar waves, for determining the distance between individual antennas and the loading surface.

9. The device of claim 1, wherein each of the antennas is monostatic.

10. The device of claim 1, wherein each of the antennas is bistatic.

* * * * *